(12) United States Patent
Takezawa

(10) Patent No.: US 8,153,292 B2
(45) Date of Patent: Apr. 10, 2012

(54) ELECTROCHEMICAL DEVICE, MANUFACTURING METHOD OF ELECTRODE THEREOF AND PROCESSING APPARATUS FOR ELECTRODE OF ELECTROCHEMICAL DEVICE

(75) Inventor: Hideharu Takezawa, Nara (JP)

(73) Assignee: Panasonic Corporation, Osaka (JP)

( * ) Notice: Subject to any disclaimer, the term of this patent is extended or adjusted under 35 U.S.C. 154(b) by 1035 days.

(21) Appl. No.: 12/100,774

(22) Filed: Apr. 10, 2008

(65) Prior Publication Data

US 2008/0254353 A1   Oct. 16, 2008

(30) Foreign Application Priority Data

Apr. 13, 2007   (JP) ................... 2007-105618

(51) Int. Cl.
*H01M 10/36* (2010.01)
(52) U.S. Cl. ........................................ 429/122; 429/322
(58) Field of Classification Search .................. 429/122, 429/322
See application file for complete search history.

(56) References Cited

U.S. PATENT DOCUMENTS

| | | | |
|---|---|---|---|
| 5,395,711 A | 3/1995 | Tahara et al. | |
| 6,001,139 A | 12/1999 | Asanuma et al. | |
| 2005/0130043 A1* | 6/2005 | Gao et al. | 429/231.95 |
| 2005/0281727 A1* | 12/2005 | Yoshizawa et al. | 423/385 |

FOREIGN PATENT DOCUMENTS

| | | |
|---|---|---|
| JP | 06-325765 | 11/1994 |
| JP | 2005-038720 | 2/2005 |
| JP | 2005-196970 | 7/2005 |
| WO | WO 96/27910 | 9/1996 |

* cited by examiner

*Primary Examiner* — Jane Rhee
(74) *Attorney, Agent, or Firm* — McDermott Will & Emery LLP

(57) ABSTRACT

According to a method for manufacturing an electrode of an electrochemical device, an electrode precursor capable of absorbing and releasing lithium is provided with lithium, and the resistance of the electrode precursor is measured after absorbing lithium. In addition, a processing apparatus for an electrode of an electrochemical device includes a lithium providing section for providing lithium to such an electrode precursor, and a first measurement section for measuring the resistance of the electrode precursor after absorbing lithium.

9 Claims, 5 Drawing Sheets

ELECTROCHEMICAL DEVICE, MANUFACTURING METHOD OF ELECTRODE THEREOF AND PROCESSING APPARATUS FOR ELECTRODE OF ELECTROCHEMICAL DEVICE

BACKGROUND OF THE INVENTION

1. Field of the Invention

The present invention relates to a method for manufacturing an electrode of an electrochemical device such as a nonaqueous electrolyte secondary battery. More particularly, it relates to a technology for controlling an amount of absorbed lithium, which compensates irreversible capacity of an electrode with high accuracy and suitable for mass production.

2. Background Art

Since an electrochemical device using lithium has large theoretical capacity, it has been developed to be used as a main electric power source of various equipments. Hereinafter, a nonaqueous electrolyte secondary battery is described as an example.

It is required that a nonaqueous electrolyte secondary has larger capacity. Therefore, a negative electrode active material is being changed from a carbon material such as graphite having theoretical capacity of less than 400 mAh/g to a material containing silicon, tin, or the like, having nearly 10 times larger theoretical capacity.

All negative electrode active materials, even a carbon material, have a loss of capacity (irreversible capacity) that is difference between chargeable capacity and dischargeable capacity at initial charge and discharge. In particular, the irreversible capacity of a large capacity material containing silicon, tin, or the like, is known to be large. This irreversible capacity is thought to be generated because lithium is inactivated by the side reaction with an electrolyte solution or with a negative electrode active material at the time of charging. The irreversible capacity thus caused by a negative electrode active material may cause a loss of a part of the reversible capacity of a positive electrode that is a source of lithium ions forming the substance of battery capacity. Therefore, the irreversible capacity results in the deterioration of battery capacity.

In order to prevent the deterioration of battery capacity caused by irreversible capacity, technologies for supplying a negative electrode active material with lithium in advance have been proposed. Specifically, a method of attaching a foil of metallic lithium and the like to a negative electrode using composite oxide containing tin and the like, by, for example, a roll transfer is disclosed. Thereafter, by injecting an electrolyte solution when a battery is assembled, a negative electrode active material is allowed to absorb lithium (see, for example, International Publication No. WO 96/027910).

In this method, however, an amount of lithium that is intended to be absorbed by the negative electrode active material is much smaller than the amount of provided lithium based on the lower value of the thickness (about 30 μm) of a metallic lithium foil that can be subjected to handling. Therefore, a metallic lithium foil is placed substantially partially, and it is not possible to allow the negative electrode to absorb lithium uniformly. As a result, deformation of the negative electrode due to expansion or ununiformity of the charge and discharge reaction may be caused.

In addition, a method of forming a layer of light metal such as metallic lithium on a mixture layer containing a negative electrode active material by a dry film formation method such as a vacuum evaporation method is disclosed. When this negative electrode is held in a dry atmosphere or an electrolyte solution, lithium is absorbed by the negative electrode (see, for example, Japanese Patent Application Unexamined Publication No. 2005-038720).

In this method, it is possible to form a lithium layer itself that is thinner than a lithium foil by a vacuum evaporation method. However, even when the thickness of the lithium layer differs from the desired value for some reason, it is not possible to know the difference. Therefore, a negative electrode in which the thickness of the lithium layer significantly differs from the desired value may be produced continuously.

Additionally, a technology of producing an electrochemical cell prior to the assembly of a battery and charging a negative electrode by using a counter electrode capable of absorbing and releasing lithium is proposed (see, for example, Japanese Patent Application Unexamined Publication No. H06-325765).

In this method, it is possible to precisely evaluate an amount of lithium to be provided to a negative electrode active material from the amount of current to be passed in the electrochemical cell. However, when such an electrochemical cell is configured, continuous production becomes difficult and thus this method is not suitable for mass production.

SUMMARY OF THE INVENTION

The present invention is a method for precisely grasping and controlling an amount of lithium to be provided to an electrode precursor when lithium in the amount corresponding to the irreversible capacity is compensated with respect to a negative electrode active material. Thus, it is possible to mass-produce a negative electrode of a nonaqueous electrolyte secondary battery with high accuracy, for example. The method for manufacturing an electrode of an electrochemical device of the present invention includes step A for providing lithium to an electrode precursor capable of absorbing and releasing lithium; and step B for measuring resistance of the electrode precursor that has absorbed lithium. Furthermore, a processing apparatus for an electrode of an electrochemical device of the present invention, which realizes such a manufacturing method, includes a lithium providing section for providing lithium to an electrode precursor capable of absorbing and releasing lithium; and a first measurement section for measuring resistance of the electrode precursor that has absorbed lithium.

In this way, by measuring the resistance of the electrode precursor that has absorbed lithium, the amount of lithium absorbed by the electrode precursor can be grasped precisely. Thus, it is possible to manage or control the amount of lithium absorbed by the electrode precursor. Therefore, when the manufacturing method and processing apparatus for an electrode of an electrochemical device of the present invention are used, it is possible to mass-produce an electrochemical device having a large capacity, excellent charge and discharge cycle characteristics, and less variation of such characteristics.

DETAILED DESCRIPTION OF THE INVENTION

Figure 1:
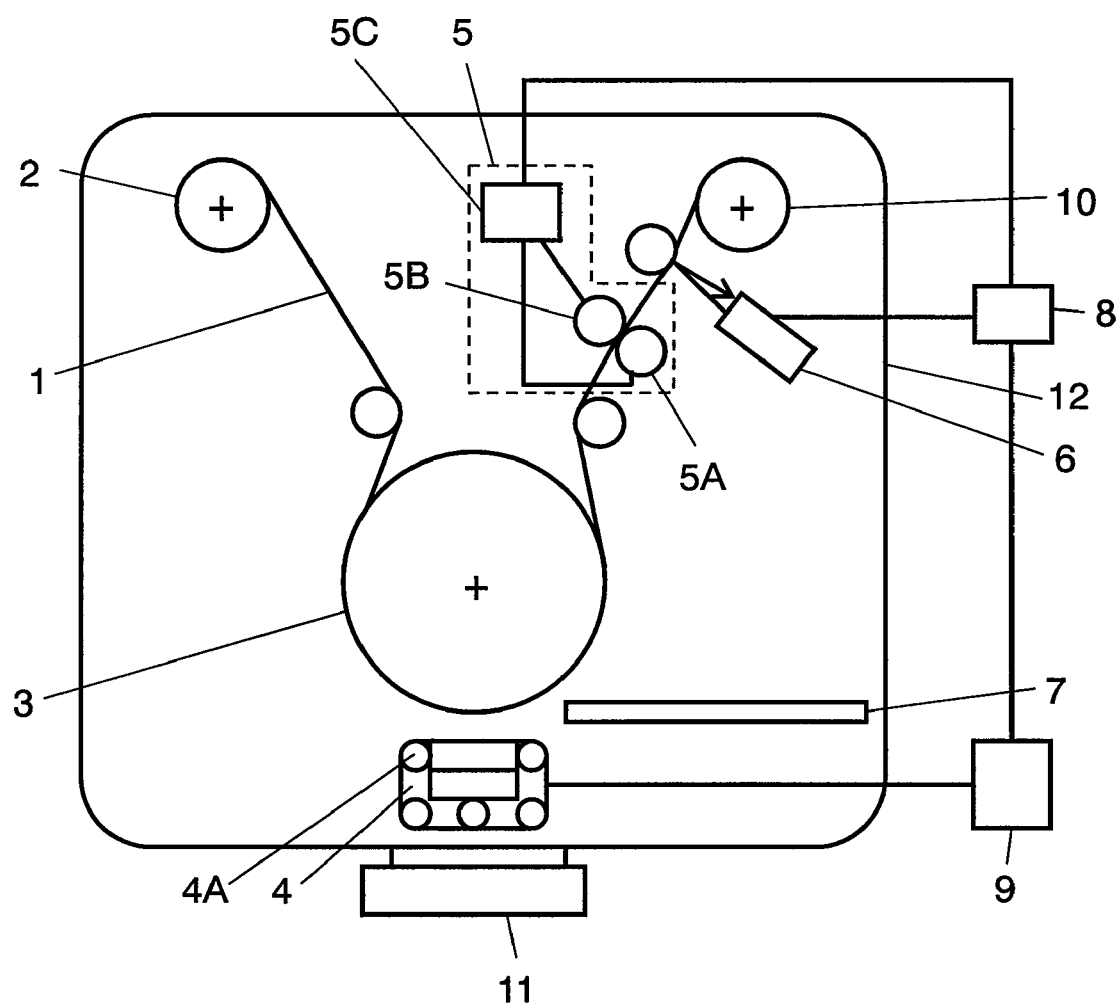
FIG. 1 is a schematic view showing a configuration of a processing apparatus for an electrode of an electrochemical device in accordance with an embodiment of the present invention.

FIG. 1 is a schematic view showing a configuration of a processing apparatus of an electrode of an electrochemical device in accordance with an embodiment of the present invention. This processing apparatus includes a lithium providing section, first measurement section 5, second measurement section 6, estimation section 8 and adjustment section 9. First measurement section 5 and second measurement section 6 are connected to estimation section 8. Adjustment section 9 is connected to estimation section 8 and the lithium providing section. Firstly, the configuration of the lithium providing section is described.

Feeding roll 2, film formation can roll 3, evaporation boat 4, first measurement section 5, shutter 7, and winding-up roll 10 are provided inside chamber 12 that is connected to vacuum pump 11. Electrode precursor 1 wound out from feeding roll 2 is set so that it is forwarded to winding-up roll 10 via film formation can roll 3. Evaporation boat 4 having heater 4A is disposed immediately beneath film formation can roll 3. A lithium metal rod that is a vapor deposition source is loaded in evaporation boat 4. By opening shutter 7 after evaporation boat 4 is sufficiently heated, lithium is provided to electrode precursor 1 on film formation can roll 3. The lithium providing section is configured in this way. By using a dry film formation method, the lithium providing section can provide an appropriate amount of lithium to electrode precursor 1 uniformly.

First measurement section 5 includes measurement rolls 5A and 5B and resistance measurement device 5C. Measurement rolls 5A and 5B as measurement electrodes are provided so that they are brought into contact with electrode precursor 1 after being provided with lithium and they sandwich electrode precursor 1 therebetween. Measurement rolls 5A and 5B are configured by placing conductive rubber on a cylindrical surface of a metal roll made of, for example, stainless steel of SUS 304. Resistance measurement device 5C is connected to measurement rolls 5A and 5B and measures the resistance between them by, for example, a constant current method. In this way, first measurement section 5 evaluates the resistance of electrode precursor 1. That is to say, resistance measurement device 5C allows a constant current to flow to electrode precursor 1 provided with lithium via measurement rolls 5A and 5B and calculates the resistance from electric potential generated in measurement rolls 5A and 5B by Ohm's law.

Figure 4:
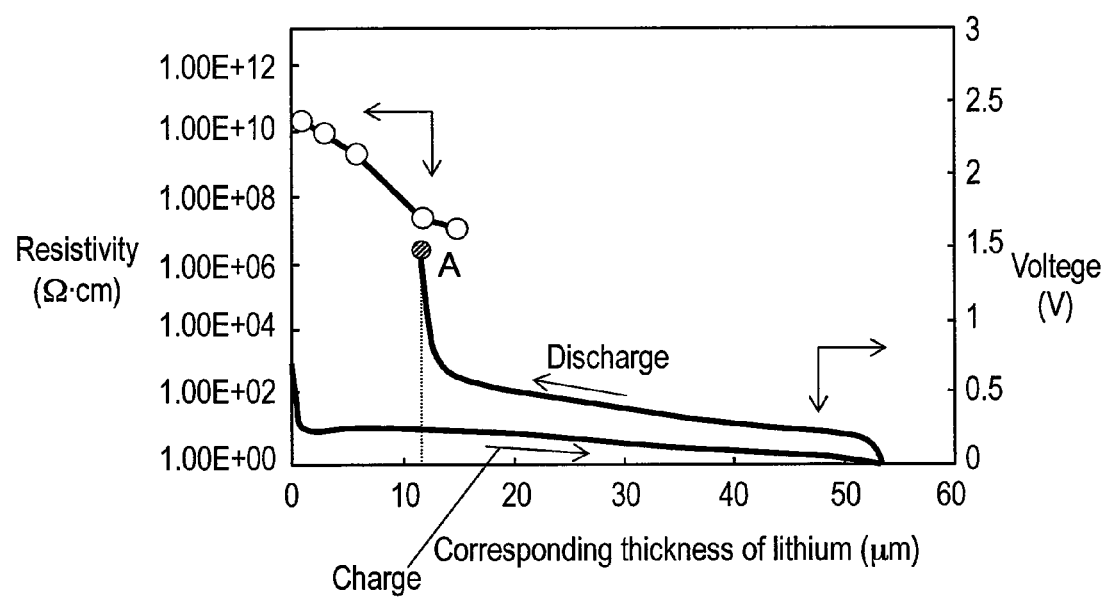
FIG. 4 is a correlation diagram showing an example of a relation between the resistivity measured by the first measurement section in the processing apparatus shown in FIG. 1 and the amount of actually absorbed lithium.

Next, the principle on which an amount of lithium provided per unit area of electrode precursor 1 is examined by calculating the resistance of electrode precursor 1 is described. FIG. 4 is a correlation diagram showing an example of a relation between a resistivity of electrode precursor 1 measured by first measurement section 5 and an amount of actually absorbed lithium per unit area. Hereinafter, the amount of lithium absorbed per unit area is abbreviated as "amount of absorbed lithium." Note here that the amount of absorbed lithium is expressed in terms of the thickness of lithium. A curve shown together is a first charge and discharge curve when an active material ($SiO_{0.6}$) constituting electrode precursor 1 is electrochemically charged and discharged at a current density of 0.1 mA/cm$^2$ by using metallic lithium as a counter electrode. When silicon oxide having large theoretical capacity is used as the active material, the discharge capacity becomes small with respect to the charge capacity at the first charge and discharge. That is to say, for example, the first discharge is terminated at point A. In other words, a value obtained by subtracting the discharge capacity to point A from the charge capacity corresponds to irreversible capacity. Then, it is necessary to supply electrode precursor 1 with lithium in advance until the capacity expressed in terms of the corresponding thickness of lithium reaches the capacity at point A.

When lithium is compensated sequentially until the capacity expressed in terms of the corresponding thickness of lithium reaches the capacity at point A and resistance is measured by using first measurement section 5, as the amount of absorbed lithium is increased, the resistivity tends to be reduced. This resistivity is changed based on the amount of absorbed lithium per unit weight of the active material. Therefore, it is possible to obtain information about the amount of absorbed lithium per unit weight of the active material by measuring the resistance of electrode precursor 1.

The lithium providing section can provide an appropriate amount of lithium to electrode precursor 1 uniformly by using a dry film formation method. However, in accordance with the change of the temperature of evaporation boat 4 that includes the lithium supply source or the decrease of the amount of lithium in evaporation boat 4, the lithium supplying rate is changed. Therefore, the amount of lithium provided to electrode precursor 1 may vary. Furthermore, a part of lithium provided toward electrode precursor 1 may be affected by the change of the vacuum degree and the part may be turned into inactive lithium oxide. Therefore, in FIG. 1, even if a constant amount of lithium is always provided from evaporation boat 4 toward electrode precursor 1, the amount of lithium provided to electrode precursor 1 may vary.

Therefore, first measurement section 5 calculates an amount of lithium absorbed by electrode precursor 1 as resistance by collating the obtained resistance value with a previously prepared calibration curve (relation between the amount of absorbed lithium and resistance). Therefore, when an amount of the active material per unit area of electrode precursor 1 is constant, it is possible to know the amount of provided lithium per unit area of electrode precursor 1 by measuring the resistance of electrode precursor 1.

However, the amount of active material per unit area of electrode precursor 1 may be changed during manufacture. Therefore, even if a constant amount of lithium is always provided toward electrode precursor 1 from evaporation boat 4, lithium cannot be provided to electrode precursor 1 uniformly. In this case, in FIG. 1, even if a constant amount of lithium is always provided to electrode precursor 1 from evaporation boat 4, the resistance is changed when the amount of the active material per unit area is changed.

Then, it is preferable to measure the thickness of electrode precursor 1. Thus, it is possible to manage the amount of active material per unit area of electrode precursor 1. In particular, since electrode precursor 1 is expanded by absorbing lithium, it is preferable that second measurement section 6 measures the thickness of electrode precursor 1. Second measurement section 6 can be configured by, for example, a laser displacement gauge.

Furthermore, since the resistance of electrode precursor 1 is affected by the thickness, it is preferable that the volume resistivity $\rho v$ is calculated from the measured resistance based on the equation (1). Thus, a more precise amount of absorbed lithium can be estimated.

$$\rho v = R \times A/t \qquad (1)$$

wherein R represents resistance; A represents measured area; and t represents the thickness of electrode precursor 1.

Note here that measurement area A can be regarded as substantially constant when the pressing pressure by measurement rolls 5A and 5B are made to be constant. Therefore, volume resistivity ρv can be calculated by using resistance R measured by first measurement section 5 and thickness t measured by second measurement section 6. Then, estimation section 8 stores a calibration curve showing the correlation between the amount of absorbed lithium and the resistance as shown in FIG. 4 in accordance with the thickness of electrode precursor 1. Therefore, estimation section 8 can estimate the amount of provided lithium (amount of absorbed lithium) per unit area of electrode precursor 1 by using resistance R and thickness t.

Figure 2A:
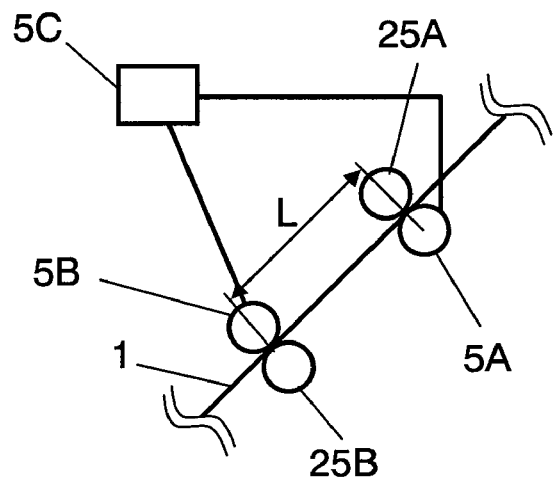
FIGS. 2A to 3B are schematic views showing other configurations of a first measurement section in the processing apparatus shown in FIG. 1.

Note here that first measurement section 5 may have a configuration other than that shown in FIG. 1. FIGS. 2A to 3B are schematic views showing other configurations of first measurement section 5. In FIG. 2A, measurement rolls 5A and 5B are apart from each other by distance L and disposed so that they are brought into contact with respective surfaces of electrode precursor 1. Furthermore, counter roll 25A is provided together with measurement roll 5A in such a manner that they sandwich electrode precursor 1 therebetween. Counter roll 25B is provided together with measurement roll 5B in such a manner that they sandwich electrode precursor 1 therebetween.

In this case, distance L corresponds to thickness t that is a length in the direction of current in equation (1) and the product of the width of the route of the current between measurement rolls 5A and 5B and thickness t corresponds to measured area A. When the width of electrode precursor 1 and the length in the axial direction of measurement rolls 5A and 5B are the same as each other, these values are equal to the width of the route of the current between measurement rolls 5A and 5B and the resistivity ρv can be calculated. Furthermore, when the length in the axial direction of measurement rolls 5A and 5B is smaller than the width of electrode precursor 1, precise resistivity ρv cannot be calculated. However, the value correlating to the resistivity can be calculated. Therefore, similar to the configuration shown in FIG. 1, it is possible to estimate the amount of provided lithium (absorbed amount) per unit area of electrode precursor 1.

Figure 2B:
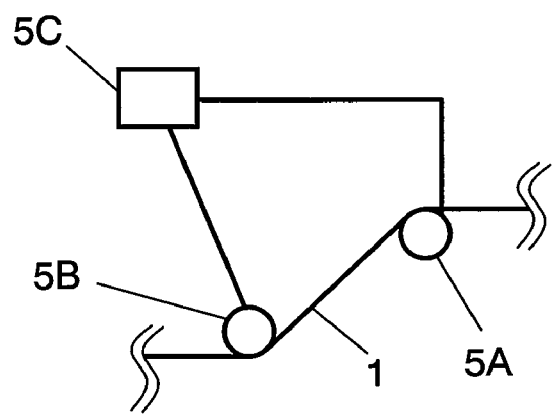

Counter rolls 25A and 25B are provided in order to make the pressures by measurement rolls 5A and 5B against electrode precursor 1 constant but they are not essential. For example, as shown in FIG. 2B, when the directions in which electrode precursor 1 forwards are changed at measurement rolls 5A and 5B respectively, electrode precursor 1 is pressed against measurement rolls 5A and 5B by tension. Therefore, even if counter rolls 25A and 25B are not provided, the resistance of electrode precursor 1 can be measured stably.

Figure 3A:
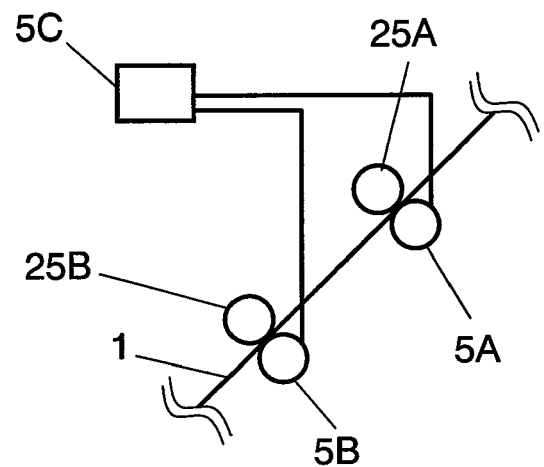

Furthermore, as shown in FIG. 3A, measurement rolls 5A and 5B may be apart from each other and brought into contact with the surface provided with lithium on electrode precursor 1. In this case, the electric current from measurement roll 5A to measurement roll 5B flows from an active material layer, a current collector to an active material layer sequentially in this order. Since the resistance of the current collector is smaller than that of the active material layer, the distance between measurement rolls 5A and 5B hardly affects equation (1). Moreover, the current route in electrode precursor 1 is substantially the same as the case where lithium is provided on both surfaces of electrode precursor 1. Therefore, the measurement accuracy is improved as compared with the configuration of FIG. 1.

Figure 3B:
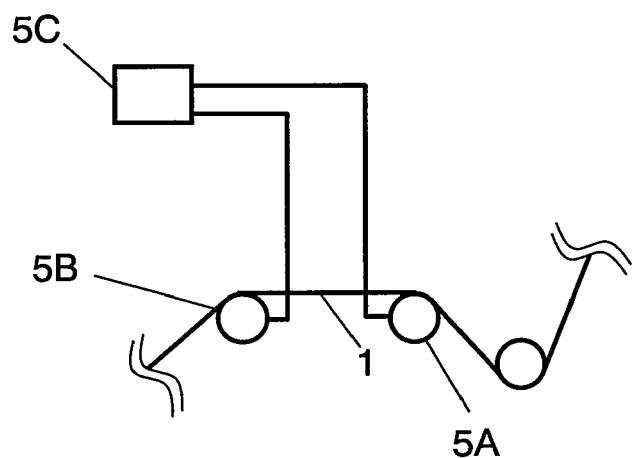

Counter rolls 25A and 25B are provided in order to make the pressures by measurement rolls 5A and 5B against electrode precursor 1 constant but they are not essential. For example, as shown in FIG. 3B, when the directions in which electrode precursor 1 forwards are changed at measurement rolls 5A and 5B respectively, electrode precursor 1 is pressed against measurement rolls 5A and 5B by tension. Therefore, even if counter rolls 25A and 25B are not provided, the resistance of electrode precursor 1 can be measured stably.

In FIG. 1, adjustment section 9 is connected to estimation section 8 and heater 4A provided in evaporation boat 4. Adjustment section 9 adjusts an amount of evaporated lithium based on the amount of lithium absorbed by electrode precursor 1, which is estimated by estimation section 8. For example, the amount of the absorbed lithium is smaller than an appropriate amount of lithium, adjustment section 9 controls heater 4A to raise a temperature so as to promote evaporation of lithium. In FIG. 1, an example in which adjustment section 9 is connected to heater 4A is described. However, adjustment section 9 may be connected to a driving source of feeding roll 2 instead of heater 4A, and when the amount of the absorbed lithium is smaller than the appropriate amount, the feeding rate of feeding roll 2 may be reduced.

By controlling the amount of provided lithium in this way, even when the continuous production is carried out, the variation in the amount of lithium absorbed by the active material of electrode precursor 1 can be suppressed to a very small range. Furthermore, since this embodiment does not use complicated treatment, for example, treatment of immersing electrode precursor 1 in an electrolyte solution, this embodiment is suitable for mass production. By using the electrode produced by such a manufacturing method, an electrochemical device having large capacity and excellent cycle characteristics can be manufactured.

Note here that an example in which a dry film formation method is used as a method for providing lithium is described. An example of the dry film formation method includes a sputtering method, a laser ablation method, an ion plating method, and the like. Among them, from the viewpoint that lithium can be provided quickly, the vacuum evaporation method is preferable.

As an active material constituting electrode precursor 1, a carbon material such as graphite can be used. However, a silicon-containing material such as Si and $SiO_x$ is suitable as a subject of this embodiment because the use of such materials enables the capacity of a nonaqueous electrolyte secondary battery to increase significantly at a relatively low cost.

It is further preferable that electrode precursor 1 includes silicon oxide represented by $SiO_x$ ($0.3 \leq x \leq 1.3$). Since the expansion of this material is smaller at the time of charging as compared with other silicone-containing materials, a nonaqueous electrolyte secondary battery having an excellent balance of characteristics can be produced.

When the electrode produced as mentioned above is used as a negative electrode of, for example, a nonaqueous electrolyte secondary battery, the nonaqueous electrolyte secondary battery having large capacity and excellent charge and discharge cycle characteristics can be obtained. Hereinafter, a configuration of a nonaqueous electrolyte secondary battery as an example of the electrochemical device is described in detail.

Figure 5:
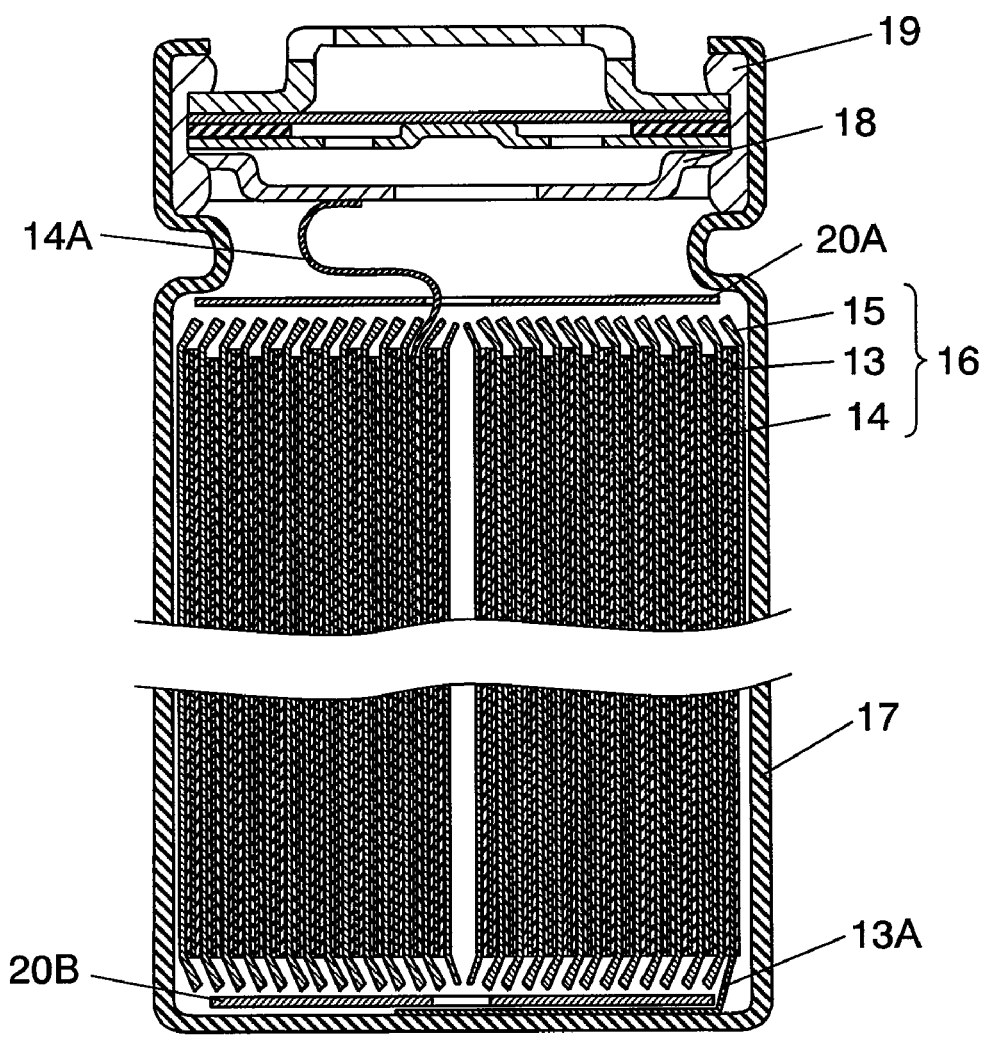
FIG. 5 is a longitudinal sectional view showing a nonaqueous electrolyte secondary battery in accordance with the embodiment of the present invention.

FIG. 5 is a longitudinal sectional view showing a nonaqueous electrolyte secondary battery in accordance with the embodiment of the present invention. It includes negative electrode 13, positive electrode 14 facing negative electrode 13 and reducing a lithium ion at the time of discharging, and nonaqueous electrolyte (not shown) having a lithium ion conductivity. Positive electrode 14 reversibly absorbs and releases a lithium ion. Nonaqueous electrolyte is interposed between negative electrode 13 and positive electrode 14.

Lead 13A made of, for example, copper is placed at one end of negative electrode 13. Lead 14A made of, for example, aluminum is placed at one end of negative electrode 14.

Negative electrode 13 and positive electrode 14 are wound together with separator 15 that prevents the direct contact therebetween so as to form electrode group 16. Then, insulating palates 20A and 20B are mounted on the upper and lower parts of electrode group 16. The other end of lead 14A is welded to sealing plate 18. The other end of lead 13A is welded to the inner bottom part of case 17 after electrode group 16 is inserted into case 17. Furthermore, the nonaqueous electrolyte is poured into case 17 and an opening end portion of case 17 is caulked to sealing plate 18 via gasket 19. Thus, the nonaqueous electrolyte secondary battery is configured. In general, positive electrode 14 is composed of a positive current collector and a positive electrode mixture layer containing a positive electrode active material.

The positive electrode mixture layer includes lithium-containing composite oxide, for example, $LiCoO_2$, $LiNiO_2$, $Li_2MnO_4$, or a mixture or a composite compound thereof as the positive electrode active material. As the positive electrode active material, in addition to the above-mentioned materials, olivine-type lithium phosphate represented by the general formula: $LiMPO_4$ (M=V, Fe, Ni, Mn), lithium fluorophosphates represented by the general formula: $Li_2MPO_4F$ (M=V, Fe, Ni, Mn) can be also used. Furthermore, a part of such a lithium-containing compound may be substituted by a different kind of element. The surface thereof may be treated with metallic oxide, lithium oxide, a conductive agent, and the like. Furthermore, the surface thereof may be subjected to hydrophobic treatment.

The positive electrode mixture layer further includes a conductive agent and a binder. As the conductive agent, graphites such as natural graphite and artificial graphite; carbon blacks such as acetylene black, Ketjen black, channel black, furnace black, lampblack and thermal black; conductive fibers such as carbon fiber and metal fiber; metal powders such as aluminum (Al) powder; conducive whiskers of zinc oxide, potassium titanate, and the like; conductive metal oxide such as titanium oxide; and an organic conductive material such as phenylene derivatives, and the like, can be used.

An example of the binder may include PVDF, polytetrafluoroethylene, polyethylene, polypropylene, aramid resin, polyamide, polyimide, polyamide-imide, polyacrylnitrile, polyacrylic acid, polymethylacrylate, polyethylacrylate, polyhexylacrylate, polymethacrylic acid, polymethylmethacrylate, polyethylmethacrylate ester, polyhexylmethacrylate, polyvinyl acetate, polyvinylpyrrolidone, polyether, polyethersulfone, hexafluoropolypropylene, styrene-butadiene rubber, carboxymethylcellulose, and the like. Furthermore, a copolymer of two or more kinds of materials selected from tetrafluoroethylene, hexafluoroethylene, hexafluoropropylene, perfluoro-alkylvinyl ether, vinylidene-fluoride, chlorotrifluoroethylene, ethylene, propylene, pentafluoropropylene, fluoromethylvinyl ether, acrylic acid, and hexadiene, may be used. Furthermore, two or more selected from these materials may be mixed and used As the positive current collector used for positive electrode 14, Al, carbon, conductive resin, and the like can be used. Furthermore, any of these materials may be subjected to surface treatment with carbon and the like.

As the nonaqueous electrolyte, an electrolyte solution obtained by dissolving a solute in an organic solvent, a polymer electrolyte containing such an electrolyte solution and immobilized by a polymer can be used. When at least an electrolyte solution is used, it is preferable that separator 15 is used between positive electrode 14 and negative electrode 13, and that separator 15 is impregnated with the electrolyte solution. Separator 15 is made of a non-woven fabric or a microporous membrane composed of, for example, polyethylene, polypropylene, aramid resin, amide-imide, polyphenylene sulfide, polyimide, and the like. Furthermore, inside or on the surface of separator 15, a heat resistant filler such as alumina, magnesia, silica, and titania may be included. Besides separator 15, a heat resistant layer made of such a filler, and a binder similar to that used for positive electrode 14 and negative electrode 13 may be provided.

A nonaqueous electrolyte material is selected based on the oxidation-reduction potential of each active material. An example of the solute preferably used for the nonaqueous electrolyte may include salts generally used in a lithium battery, for example, $LiPF_6$, $LiBF_4$, $LiClO_4$, $LiAlCl_4$, $LiSbF_6$, $LiSCN$, $LiCF_3SO_3$, $LiCF_3CO_2$, $LiAsF_6$, $LiB_{10}Cl_{10}$, lower aliphatic lithium carboxylate, LiF, LiCl, LiBr, LiI, lithium chloroborane, lithium bis(1,2-benzenedioleate(2-)—O,O') borate, lithium bis(2,3-naphthalenedioleate(2-)—O,O') borate, lithium bis(2,2'-biphenyldioleate(2-)—O,O') borate, lithium bis(5-fluoro-2-oleate-1-benzenesulfonate-O,O') borate and other borates, $(CF_3SO_2)_2NLi$, $LiN(CF_3SO_2)(C_4F_9SO_2)$, $(C_2F_5SO_2)_2NLi$, lithium tetraphenyl borate, and the like.

Furthermore, as an example of the organic solvent in which the above-mentioned salts are dissolved, solvents that are generally used in a lithium battery, for example, ethylene carbonate (EC), propylene carbonate, butylene carbonate, vinylene carbonate, dimethyl carbonate (DMC), diethyl carbonate, ethyl methyl carbonate (EMC), dipropyl carbonate, methyl formate, methyl acetate, methyl propionate, ethyl propionate, dimethoxymethane, γ-butyrolactone, γ-valerolactone, 1,2-diethoxyethane, 1,2-dimethoxyethane, ethoxymethoxyethane, trimethoxy methane, tetrahydrofuran, tetrahydrofuran derivative such as 2-methyltetrahydrofuran, dimethyl sulfoxide, dioxolane derivative such as 1,3-dioxolane, 4-methyl-1,3-dioxolane, formamide, acetamide, dimethylformamide, acetonitrile, propyl nitrile, nitromethane, ethyl monoglyme, phosphotriester, acetic acid ester, propionic acid ester, sulfolane, 3-methyl sulfolane, 1,3-dimethyl-2-imidazolidinone, 3-methyl-2-oxazolidinone, propylene carbonate derivative, ethyl ether, diethyl ether, 1,3-propanesultone, anisole, and fluorobenzene, may be used singly or may be in a combination of one or more thereof.

Furthermore, an additive such as vinylene carbonate, cyclohexylbenzene, biphenyl, diphenyl ether, vinyl ethylene carbonate, divinyl ethylene carbonate, phenylethylene carbonate, diallyl carbonate, fluoroethylene carbonate, catechol carbonate, vinyl acetate, ethylene sulfite, propanesultone, trifluoropropylene carbonate, dibenzofuran, 2,4-difluoroanisole, o-terphenyl, m-terphenyl, and the like may be included.

Note here that as nonaqueous electrolyte, a solid electrolyte may be used. The solid electrolyte is obtained by mixing the above-mentioned solute in one or more of polymer materials such as polyethylene oxide, polypropylene oxide, polyphosphazene, polyaziridine, polyethylene sulfide, polyvinyl alcohol, polyvinylidene fluoride, and polyhexafluoropropylene. Furthermore, it may be used as a gel-state mixture with the above-mentioned organic solvent. Furthermore, an inorganic material such as lithium nitride, lithium halide, lithium oxoate, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, a phosphorus sulfide compound, and the like may be used as a solid electrolyte. When a gel-state nonaqueous electrolyte is used, the gel-state nonaqueous electrolyte instead of the separator may be disposed between positive electrode 14 and negative electrode 13. Furthermore, the gel-state nonaqueous electrolyte may be disposed in the vicinity of separator 15.

Negative electrode 13 is composed of a negative electrode current collector and an active material layer including a negative electrode active material. Then, negative electrode 13 is configured by allowing the active material layer of electrode precursor 1 to absorb lithium by the above-mentioned method and cutting into a predetermined size. In order to form the active material layer on the negative electrode current collector, similar to positive electrode 14, a mixture layer including a negative electrode active material, a conductive agent and a binder may be formed as the active material layer capable of absorbing and releasing lithium. Alternatively, an active material may be disposed directly on the negative electrode current collector by a gas phase method and the like. In this case, it is preferable that the active material is formed into a plurality of independent columnar bodies. A method for manufacturing such a negative electrode is disclosed in, for example, Japanese Patent Application Unexamined Publication No. 2005-196970.

The current collector of negative electrode 13 is made of a metal foil of stainless steel, nickel, copper, titanium, and the like, thin film of carbon, conductive resin, and the like. Furthermore, the current collector may be subjected to surface treatment with carbon, nickel, titanium, and the like.

In the above description, a cylindrical battery having wind-type electrode group 16 is described as an example. However, the present invention is not limited to this configuration of the electrode group and the shape of battery. Furthermore, the present invention is not limited to the nonaqueous electrolyte secondary battery as long as it uses an electrochemical reaction of reversibly absorbing and releasing lithium ions.

Furthermore, an example in which lithium is provided to electrode precursor 1 by a dry film formation method is described. However, a technique for grasping the amount of provided lithium by measuring resistance can be applied to the case where lithium is provided by a wet method.

As mentioned above, when a method for manufacturing an electrode of an electrochemical device of the present invention is used, electrochemical devices having large capacity, an excellent charge and discharge cycle characteristics, and less variation in these characteristics can be mass-produced. Therefore, the present invention is useful for manufacturing nonaqueous electrolyte secondary batteries used in equipment from portable electronic equipment such as a notebook-sized personal computer, a portable telephone and PDA, which large demand is expected, to large electronic equipment.

What is claimed is:

1. A method for manufacturing an electrode of an electrochemical device, the method comprising:
   (A) providing lithium to an electrode precursor capable of absorbing and releasing lithium;
   (B) measuring resistance of the electrode precursor after absorbing lithium;
   (C) measuring a thickness of the electrode precursor after absorbing lithium; and
   (D) estimating an amount of lithium absorbed by the electrode precursor based on the resistance measured in (B) and the thickness measured in (C),
   wherein an amount of lithium provided in (A) is adjusted based on the amount of absorbed lithium estimated in (D).

2. The method for manufacturing an electrode of an electrochemical device according to claim 1, wherein the amount of provided lithium is adjusted by adjusting a rate of providing lithium in (A).

3. The method for manufacturing an electrode of an electrochemical device according to claim 2, wherein in (A), lithium is provided to the electrode precursor by using lithium vapor and a rate of generating the lithium vapor is adjusted so as to adjust the rate of providing lithium.

4. The method for manufacturing an electrode of an electrochemical device according to claim 1, wherein the electrode precursor comprises at least one of silicon and tin.

5. The method for manufacturing an electrode of an electrochemical device according to claim 4, wherein the electrode precursor comprises silicon oxide represented by $SiO_x$ ($0.3 \leq x \leq 1.3$).

6. The method for manufacturing an electrode of an electrochemical device according to claim 1, further comprising:
   forming an active material layer capable of absorbing and releasing lithium on a current collector so as to produce the electrode precursor.

7. A processing apparatus for an electrode of an electrochemical device, comprising:
   a lithium providing section configured to provide lithium to an electrode precursor capable of absorbing and releasing lithium;
   a first measurement section configured to measure resistance of the electrode precursor after absorbing lithium;
   a second measurement section configured to measure a thickness of the electrode precursor after absorbing lithium;
   an estimation section configured to estimate an amount of lithium absorbed by the electrode precursor based on the resistance measured by the first measurement section and the thickness measured by the second measurement section; and
   an adjustment section configured to adjust an amount of lithium provided by the lithium providing section to a predetermined amount based on the amount of absorbed lithium estimated by the estimation section.

8. The processing apparatus according to claim 7, wherein the adjustment section is configured to adjust the amount of provided lithium by adjusting a rate of providing lithium in the lithium providing section.

9. The processing apparatus according to claim 8, wherein the lithium providing section is configured to generate lithium vapor and the adjustment section is configured to adjust a rate of generating lithium vapor in the lithium providing section, thereby adjust the rate of providing lithium.

* * * * *